United States Patent
Ebel (10) Patent No.: US 9,457,694 B2
(45) Date of Patent: Oct. 4, 2016

(54) DEVICE AND METHOD FOR OPERATING A PLURALITY OF FILLABLE CONTAINERS, IN PARTICULAR INFLATABLE AIR CUSHIONS IN A MOTOR VEHICLE SEAT

(75) Inventors: Martin Ebel, Ingolstadt (DE); Birgit Ferstl, legal representative, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 372 days.

(21) Appl. No.: 13/995,112

(22) PCT Filed: Dec. 6, 2011

(86) PCT No.: PCT/EP2011/071976
§ 371 (c)(1),
(2), (4) Date: Jun. 24, 2014

(87) PCT Pub. No.: WO2012/080045
PCT Pub. Date: Jun. 21, 2012

(65) Prior Publication Data
US 2014/0318667 A1  Oct. 30, 2014

(30) Foreign Application Priority Data
Dec. 15, 2010  (DE) .................. 10 2010 063 136

(51) Int. Cl.
*B60N 2/44* (2006.01)
*F17C 5/06* (2006.01)
*F17C 13/02* (2006.01)

(52) U.S. Cl.
CPC ............. *B60N 2/4415* (2013.01); *F17C 5/06* (2013.01); *F17C 13/025* (2013.01)

(58) Field of Classification Search
CPC ................................. F17C 13/025; F17C 5/06
USPC .................. 141/95, 234, 237, 238, 242–244; 297/284.3; 137/596.14, 596.18
See application file for complete search history.

(56) References Cited

U.S. PATENT DOCUMENTS

| 4,655,505 A | * | 4/1987 | Kashiwamura | ........ A47C 7/467 297/284.6 |
| 6,088,643 A | * | 7/2000 | Long | ........ A47C 4/54 297/284.3 |

(Continued)

FOREIGN PATENT DOCUMENTS

| CN | 102161321 A | 8/2011 | ............. B60N 2/22 |
| DE | 3804960 A1 | 8/1989 | ............. A47C 27/10 |

(Continued)

OTHER PUBLICATIONS

Chinese Office Action, Application No. 201180067639.6, 16 pages, Apr. 23, 2015.

(Continued)

*Primary Examiner* — John K Fristoe, Jr.
*Assistant Examiner* — Paul Gray
(74) *Attorney, Agent, or Firm* — Slayden Grubert Beard PLLC (57) ABSTRACT

A device for operating a plurality of containers fillable with a medium may include a plurality of container valves each connected to of one of the containers, and a filling channel arrangement connectable or connected at one end to a media pressure source and connected at the other end to the respective container valves. In order to simplify determination of the media pressure in the individual containers and, furthermore, to permit different filling speeds, an emptying channel arrangement is connected at one end to the container valves and connectable at the other end to an unpressurized media hollow via an emptying channel valve. The media pressure in one of the containers can be calculated using a mathematical model. A filling channel valve may be provided for selectively connecting the filling channel arrangement to the media pressure source either directly or via a throttle in order to permit different filling speeds.

10 Claims, 3 Drawing Sheets

(56) References Cited

U.S. PATENT DOCUMENTS

| | | |
|---|---|---|
| 6,422,087 B1 | 7/2002 | Potter .............................. 73/731 |
| 8,794,707 B2 | 8/2014 | Bocsanyi et al. ........ 297/452.41 |
| 2003/0023363 A1 | 1/2003 | Katz et al. ...................... 701/49 |
| 2007/0000559 A1 | 1/2007 | Ebel ................................ 141/67 |
| 2010/0036576 A1 | 2/2010 | Diekmeyer et al. ............ 701/70 |

FOREIGN PATENT DOCUMENTS

| | | | | |
|---|---|---|---|---|
| DE | 3839130 C1 | 4/1990 | ............... | A47C 7/46 |
| DE | 3804961 C2 | 8/2001 | ............. | A47C 27/10 |
| DE | 10022434 A1 | 11/2001 | ............... | A47C 7/14 |
| DE | 10333204 A1 | 2/2005 | ............. | A47C 27/08 |
| DE | 102006009052 A1 | 8/2006 | ............... | F15B 21/04 |
| DE | 102006048071 A1 | 4/2008 | ............. | B60K 25/00 |
| WO | 2012/080045 A1 | 6/2012 | ............... | B60N 2/44 |

OTHER PUBLICATIONS

International Search Report and Written Opinion, Application No. PCT/EP2011/071976, 16 pages, Apr. 4, 2012.

* cited by examiner

DEVICE AND METHOD FOR OPERATING A PLURALITY OF FILLABLE CONTAINERS, IN PARTICULAR INFLATABLE AIR CUSHIONS IN A MOTOR VEHICLE SEAT

CROSS-REFERENCE TO RELATED APPLICATIONS

This application is a U.S. National Stage application of International Application No. PCT/EP2011/071976 filed Dec. 6, 2011, which designates the United States of America, and claims priority to DE Application No. 10 2010 063 136.1 filed Dec. 15, 2010, the contents of which are hereby incorporated by reference in their entirety.

TECHNICAL FIELD

The present invention relates to a device and method for operating a plurality of fillable containers, in particular inflatable air cushions in a motor vehicle seat.

BACKGROUND

Such a device and such a method are known from the prior art for the operation of a plurality of air cushions which can be inflated with air or compressed air in a motor vehicle seat. The term "operation" means in this context that the air quantities or air pressures in the air cushions are adjusted in a desired manner, respectively. This requires the possibility of inflating or deflating the air cushions as required or of maintaining the air pressure therein. The known device comprises:
- a plurality of container valves (air cushion valves) for connecting one of the containers (air cushions), respectively, and
- a filling channel arrangement (inflation channel arrangement) which is connected, on the one hand, to a media pressure source (air compressor) and is connected, on the other hand, to the container valves, respectively.

The container valves of the known device are electrically controllable, pneumatic 3/3-way valves, that is to say, comprising three valve connections (container, filling channel arrangement, atmosphere) and having three switching positions in order to close ("maintain") the corresponding container (air cushion) as required or to connect it ("fill") to the filling channel arrangement or to connect it ("discharge") to atmosphere.

In order to be able to adjust a desired media pressure (air pressure) in the container as precisely as possible in this instance, one pressure sensor per container is necessary in the known device, for example, directly at each container or at a connection line leading from the associated container valve to the container.

However, pressure sensors which are suitable for this purpose (with adequate measurement precision) are relatively expensive. Another disadvantage of the known device is that, in the event of constant media pressure at the outlet of the media pressure source (air compressor), only one filling speed is possible. That filling speed particularly depends on the compressor output pressure and the technical flow conditions or properties of the device components, such as lines (for example, hoses), valves, etcetera.

SUMMARY

One embodiment provides a device for operating a plurality of containers which can each be filled with a medium, comprising: a plurality of container valves for connecting one of the containers, respectively, a filling channel arrangement which can be connected or is connected, on the one hand, to a media pressure source and is connected, on the other hand, to the container valves, respectively, and a discharge channel arrangement which is connected, on the one hand, to the container valves and which can be connected, on the other hand, to a pressureless media sink via a discharge channel valve.

In a further embodiment, the device comprises a control device for controlling the valves in accordance with an actuation parameter which is supplied to the control device, and wherein the control device is constructed to calculate the media pressure present in a specific container on the basis of a mathematical model taking into consideration a media pressure supplied by the media pressure source and the statuses of the valves.

In a further embodiment, the device comprises a filling channel pressure sensor for detecting a media pressure supplied by the media pressure source.

In a further embodiment, the device comprises a discharge channel pressure sensor for detecting a media pressure present in the discharge channel arrangement.

In a further embodiment, the discharge channel arrangement can further be connected to the filling channel arrangement via the discharge channel valve.

In a further embodiment, the connection which can be produced via the discharge channel valve between the discharge channel arrangement and the filling channel arrangement contains a throttle.

In a further embodiment, the devices comprising a filling channel valve, via which the filling channel arrangement can be selectively connected to the media pressure source directly or via a throttle.

Another embodiment provides a method for operating a plurality of containers which can each be filled with a medium, comprising controlling a plurality of container valves, to which, on the one hand, one of the containers is connected, respectively, and which are connected, on the other hand, to a filling channel arrangement which can be acted on with medium from a media pressure source, and controlling a discharge channel valve, by means of which a discharge channel arrangement connected to the container valves can be connected to a pressureless media sink.

In a further embodiment, the media pressure present in a specific container is calculated on the basis of a mathematical model taking into consideration a media pressure supplied by the media pressure source and the statuses of the valves.

In a further embodiment, the media pressure present in a specific container is established in that the container is connected to the discharge channel arrangement via the relevant container valve, the discharge channel arrangement is isolated from the pressureless media sink by means of the discharge channel valve, and the media pressure present in the discharge channel arrangement is measured.

In a further embodiment, the discharge channel arrangement can further be connected to the filling channel arrangement via the discharge channel valve and a throttle, and wherein there is provision for control of the discharge channel valve in order to produce that connection in order to achieve filling of a specific container which is connected to the discharge channel arrangement via the relevant container valve at a reduced filling speed.

In a further embodiment, the method comprises controlling a filling channel valve, via which the filling channel arrangement can be selectively connected to the media pressure source directly or via a throttle.

BRIEF DESCRIPTION OF THE DRAWINGS

Example embodiments are described below with reference to the drawings, in which.

DETAILED DESCRIPTION

Embodiments of the present invention provide a device or a method of the type mentioned in the introduction, to reduce the complexity for measuring or establishing the media pressure in the individual containers and/or to allow different filling speeds.

One embodiment provides a discharge channel arrangement which is connected, on the one hand, to the container valves and which can be connected, on the other hand, to a pressureless media sink via a discharge channel valve.

Accordingly, the method may include control of a discharge channel valve, by means of which a discharge channel arrangement connected to the container valves can be connected to a pressureless media sink.

This construction advantageously allows a "central pressure sensor" or a central pressure measurement to be provided in the region of the discharge channel arrangement in order to establish, for example, the media pressures in the individual containers therewith. This construction further meets the requirement for a simple achievement of two different filling speeds (cf. also in this regard explanations set out below).

The filling channel arrangement may comprise, for example, a filling channel provided to connect the media pressure source and channel branches which branch off therefrom to the container valves, respectively.

The discharge channel arrangement may comprise, for example, a discharge channel provided for connecting the discharge channel valve and channel branches which branch off therefrom to the container valves, respectively.

The volume of the filling channel arrangement is preferably relatively small, as is the volume of the discharge channel arrangement. According to an embodiment, therefore, there is provision, for example, for such a volume to be smaller by at least a factor of 100 than the smallest of the volumes of the containers to be operated. If those last volumes change during operation (such as, for example, in air cushions which can be inflated so as to increase volume), the smallest container volumes in terms of operation must be considered regarding this embodiment (for example, the volumes of air cushions which are deflated, for example, at atmospheric pressure).

If the device constitutes a pneumatic system, that is to say, for example, is provided to operate air cushions in a seat of a motor vehicle and, in the simplest case, air is provided as the "medium", for example, the atmosphere may be provided as the "pressureless media sink".

The container valves are preferably, for example, electrically controllable 3/3-way valves, by means of which a container connection may selectively be closed (isolated) ("maintain") or may be connected ("fill") to the filling channel arrangement or may be connected ("discharge") to the discharge channel arrangement.

One embodiment provides a control device to be used to control the valves of the device (for example, electronic programme-controlled control unit), which control device carries out that control action in accordance with an actuation parameter which is supplied to the control device.

The "actuation parameter" may result, for example, on the basis of an operating command of a user of the device, or may comprise such an operating command (example: the user actuates an operating knob in a motor vehicle in order to initiate specific inflation/deflation of an air cushion in a seat of the motor vehicle).

Alternatively or additionally, the actuation parameter may also originate from the device itself, in particular, for example, the control device mentioned, for instance, if a corresponding (re)filling requirement is established after a leakage of medium from a container has been detected in order to bring the media pressure in the relevant container back to the desired extent again.

In one embodiment, the device comprises a control device for controlling the valves in accordance with an actuation parameter which is supplied to the control device, and wherein the control device is constructed to calculate the media pressure present in a specific container on the basis of a mathematical model taking into consideration a media pressure supplied by the media pressure source and the statuses of the valves.

The "media pressure supplied by the media pressure source" is known in the simplest case in a manner dependent on the construction (depending on the specific construction of the media pressure source and/or the control thereof) or may be taken to be known to a given extent in a first approximation. With regard to the accuracy of that parameter used as an input variable for the mathematical model (algorithm), however, it is mostly preferable to use a pressure sensor for the purpose. According to one embodiment, the device comprises a filling channel pressure sensor for detecting a media pressure supplied by the media pressure source.

The filling channel pressure sensor can be arranged directly at a portion of the filling channel arrangement, in particular the filling channel already mentioned, or alternatively be connected to such a portion via a pressure measurement line.

The use of a mathematical model for establishing the pressure may also allow pressure sensors to be saved. For instance, the media pressures present in the containers can be established, for example, by means of one or a very small number of "commonly used" pressure sensor(s) (for example, filling channel pressure sensor) (cf. also in this regard explanations set out below).

In one embodiment, the device comprises a discharge channel pressure sensor for detecting a media pressure present in the discharge channel arrangement. The discharge channel pressure sensor can be arranged directly at a portion of the discharge channel arrangement, for example, the discharge channel mentioned, or be connected to such a portion via a pressure measurement line (for example, hose).

In one embodiment, the discharge channel arrangement can further be connected to the filling channel arrangement via the discharge channel valve. For that purpose, for example, the discharge channel valve may be, for example, an electrically controllable 3/3-way valve, by means of which the discharge channel arrangement may be selectively connected to the pressureless media sink or the filling channel arrangement, or may be closed (isolated).

In this embodiment, an additional possibility for filling the containers is advantageously provided, that is to say, via the discharge channel arrangement.

In one embodiment, the connection which can be produced via the discharge channel valve between the discharge channel arrangement and the filling channel arrangement contains a throttle.

As a result, a reduced filling speed is achieved when a container is filled via this path so that two different filling speeds are advantageously achieved depending on the filling path selected (either via the filling channel arrangement or via the filling channel arrangement and subsequently via the discharge channel arrangement).

In another embodiment, the device comprises a filling channel valve, via which the filling channel arrangement can be selectively connected to the media pressure source either directly or via a throttle.

Figure 1:
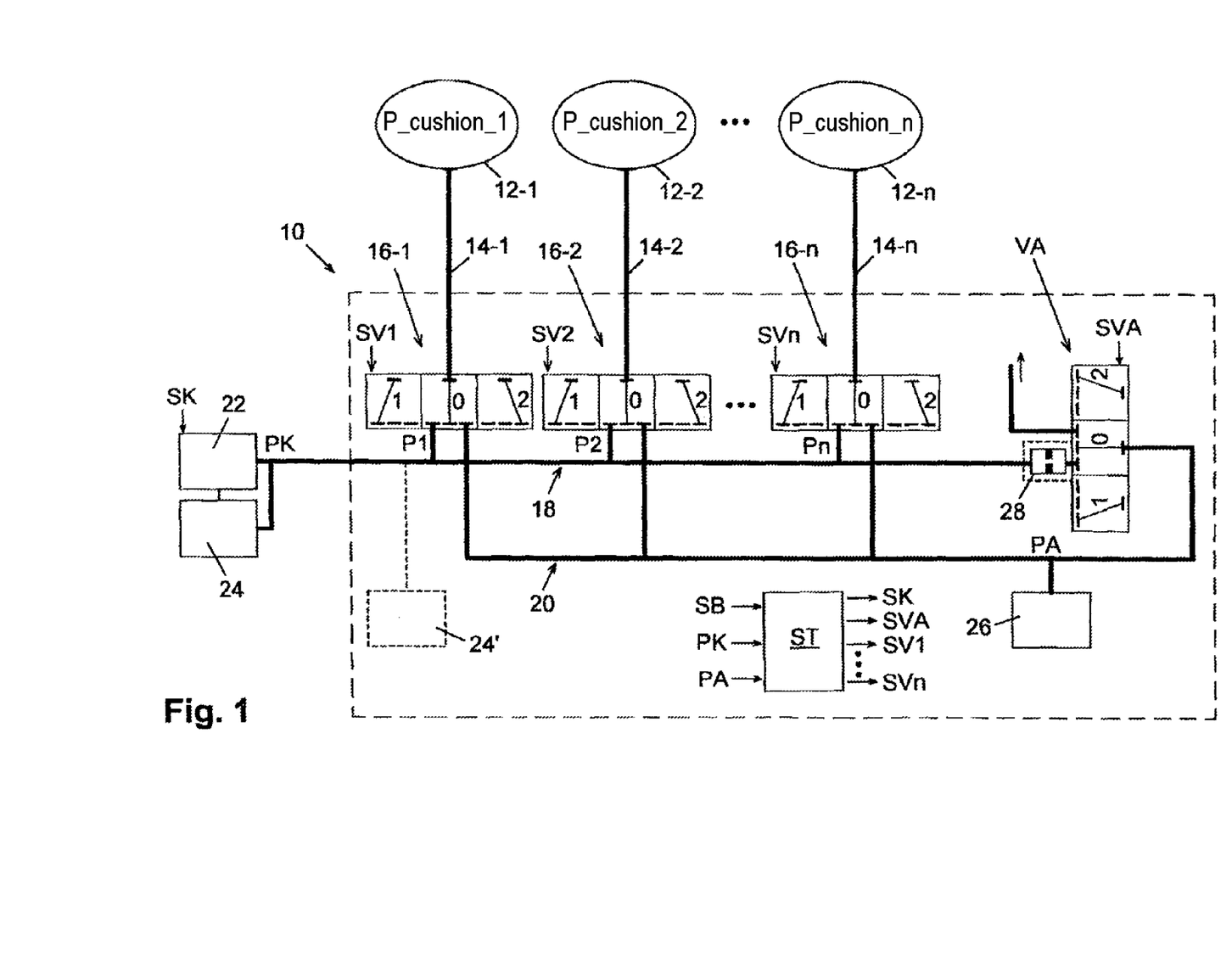
FIG. 1 is a block diagram of a device (pneumatic system) for controllably inflating and deflating a plurality of air cushions in accordance with a first embodiment.

FIG. 1 shows a device 10 which is provided for use in a motor vehicle in order to operate a plurality of inflatable air cushions 12-1, 12-2 . . . 12-n which are arranged in a "comfort seat" of the motor vehicle. The motor vehicle seat may contain, for example, at least three, in particular at least five such air cushions. In this application, each air cushion typically has a volume of approximately from 100 cm³ to 1000 cm³.

Consequently, a user of the motor vehicle seat can adapt the properties of the seat to the current preferences by inflating or deflating the individual cushions 12-1, 12-2 . . . 12-n in a controlled manner or by maintaining cushion pressures P_cushion-1, P_cushion-2 . . . , P_cushion-n, respectively.

The cushions 12-1, 12-2 . . . 12-n are connected in the example illustrated via hoses or connection lines 14-1, 14-2 . . . 14-n to one of a plurality of pneumatic valves 16-1, 16-2 . . . 16-n which are constructed as 3/3-way valves and which are also referred to below as "container valves".

The container valves 16-1, 16-2 . . . 16-n are controlled by an electronic control unit ST (for example, controlled by microprocessor) which outputs inter alia corresponding control signals SV1, SV2 . . . SVn to the container valves for this purpose.

The reference numerals of components which are provided repeatedly in one embodiment but which are similar in terms of their effect such as, for example, the air cushions 12-1, 12-2 . . . , are numbered sequentially (each supplemented by a hyphen and a continuous number). Reference is also made below to individual examples of such components or to the entirety of such components by means of the non-supplemented reference numeral.

The associated cushion 12, depending on the switching position of the valve 16, can selectively be connected by means of each container valve 16 either to a filling channel arrangement 18 or to a discharge channel arrangement 20 or be closed (isolated).

In the illustrated example, the filling channel arrangement 18 comprises a filling channel supplied with compressed air by means of an air compressor 22 and filling channel branches which branch off from it to the container valves 16, respectively. The air compressor 22 may be controlled with regard to its operation or its conveying output and is switched on and off or controlled with regard to its conveying output in this instance by a control signal SK supplied by the control unit ST.

In the Figure, a pressure present at the compressor output is designated PK and the pressures present in the filling channel branches are designated P1, P2 . . . Pn. Depending on the current operating status of the device 10, the pressures P1, P2 . . . Pn can differ from each other or from the compressor pressure PK. In the application illustrated, the compressor pressure PK is typically approximately 1000 hPa (in relation to the environmental pressure, that is to say, atmospheric pressure).

The discharge channel arrangement 20 comprises in the illustrated example a discharge channel connected to a discharge channel valve VA and discharge channel branches which branch off from it to the container valves 16, respectively. The valve VA is controlled by a control signal SVA supplied by the control unit ST.

The discharge channel valve VA could be, for example, a 2/2-way valve, by means of which the discharge channel can selectively be closed or connected to atmosphere ("pressureless media sink").

In a preferable manner and as also provided for in the example illustrated, however, the discharge channel valve VA is a 3/3-way valve, by means of which the discharge channel arrangement 20 can further be connected to the filling channel arrangement 18.

In the example illustrated, two air pressure sensors are further provided, that is to say, a filling channel pressure sensor 24 for measuring the compressor pressure PK at the output of the compressor 22 and a discharge channel pressure sensor 26 for measuring a pressure PA present in the discharge channel of the discharge channel arrangement 20.

In the embodiment illustrated, a user instruction SB is supplied to the control unit ST (on the basis of actuation of an operating element by a user of the motor vehicle seat) and corresponding input signals are supplied to the measured pressures PK and PA. The control unit ST controls the valves 16-1, 16-2 . . . 16-n and VA of the device 10 on the basis of those variables in accordance with a control algorithm.

The operation of the device 10 is explained in greater detail below.

In order to fill (inflate) a specific one of the cushions 12, the associated container valve 16 can be moved into a switching position "1" so that the relevant cushion 12 is connected via the relevant connection line 14 and the valve 16 to the filling channel arrangement 18 which is acted on with pressure by the air compressor 22 and consequently air flows from the filling channel arrangement 18 into that cushion 12. It will be understood that such a filling action can also be carried out simultaneously for a plurality of the cushions 12.

The specific construction of the device 10 illustrated further allows filling of one or more of the cushions 12 also to be brought about in that the relevant cushion 12 is connected to the discharge channel arrangement 20 via the associated container valve 16 (in the switching position "2") and the discharge channel arrangement 20 is connected via the discharge channel valve VA (in the switching position "1") to the filling channel arrangement 18 which is acted on with pressure. In that switching position combination, compressed air flows from the compressor 22 via the valve VA and the relevant valve(s) 16 (in the switching position "2") into the relevant cushions 12.

In this instance, a particular advantage is produced owing to a throttle 28 which is inserted in the connection path between the discharge channel arrangement 20 and the filling channel arrangement 18 and which ensures that a reduced filling speed results during this filling method so that two different filling speeds can be achieved for one and the same compressor pressure PK.

Advantageously, the two different filling methods can also be carried out simultaneously, that is to say, it is possible to fill, for example one or more of the cushions 12 simultaneously directly via the filling channel arrangement 18 ("first filling method") and simultaneously one or more of the remaining cushions 12 via the valve VA and the discharge channel arrangement 20 ("second filling method").

The arrangement of the throttle 28 at the side of the filling channel arrangement 18 (and not at the side of the discharge channel arrangement 20) has the particular advantage that the speed of the discharge of individual cushions 12, as will be described below, is not influenced (reduced) as a result.

The throttle 28 can be combined structurally with the valve VA in a structurally particularly simple manner, for example, as a suitably dimensioned cross-section contraction in the region of the connection of the valve VA connected to the filling channel arrangement 18.

In time phases in which the discharge channel arrangement 20 is not used to carry out the "second filling method", it is possible to discharge (deflate) one or more of the cushions 12 via that discharge channel arrangement 20 by the relevant valve(s) 16 being moved into the switching position "2" thereof and consequently being connected to the discharge channel arrangement 20 and the discharge channel arrangement being connected to atmosphere via the valve VA in the switching position "2".

At any time during operation of the device 10, each of the cushions 12 may also be closed (isolated) by the associated container valve 16 being moved into the switching status "0". The internal cushion pressure P_cushion then remains constant in those cushions 12.

With the device 10 described, apart from the description of a plurality of filling speeds already explained, extremely simplified monitoring and adjustment of the air pressures P_cushion-1, P_cushion-2 . . . , P_cushion-n in the cushions 12-1, 12-2 . . . 12-$n$ can also be achieved in relation to the prior art.

In the example illustrated, pressure sensors associated individually with the individual cushions 12 are dispensed with. Accordingly, pressure sensors are saved or the number thereof reduced in the device 10.

A pressure monitoring carried out by the control unit ST is instead carried out on the basis of the pressures PK and PA measured by the two pressure sensors 24 and 26. A mathematical model, in which the individual cushion pressures are calculated from specific peripheral conditions (compressor pressure PK, flow resistances of the relevant lines or channels, volumes of the cushions 12, etcetera), the start condition ("start pressure" in the individual cushions 12) and the switching statuses ("0", "1" or "2") of the valves 16-1, 16-2, . . . 16-$n$, VA, can be used to monitor the pressure.

The compressor pressure PK is measured by means of the pressure sensor 24 in the example illustrated and is consequently known to a high degree of accuracy. The remaining peripheral conditions such as line lengths, line diameters, etcetera, are known in any case.

A defined start condition at a relative cushion pressure of 0 hPa can be produced, for example, after sufficiently long prior deflation of the relevant cushion 12.

The switching statuses of all the valves 16-1, 16-2, . . . 16-$n$, VA are further known in the region of the control unit ST.

For example, the analogy of an electrical RC member can be used as a simple mathematical model, the resistance "R" representing the relevant flow resistance (by valve(s) and line(s)) and the capacity C representing the relevant cushion volume. The implementation of such a model places only small requirements on the resources of the control unit ST.

Such a mathematical model or the control algorithm which is processed in the control unit ST therefor is discussed again below with reference to FIGS. 3 and 4.

The additional pressure sensor 26 in the common discharge channel arrangement 20 brings about additional advantageous possibilities for pressure measurement which can be used in the context of or in addition to the mathematical model mentioned during operation of the device 10. For example, the pressure PA measured by the pressure sensor 26 during the pressure monitoring in the context of the model can be taken into consideration during deflation by means of the discharge channel arrangement 20.

Furthermore, the pressure sensor 26 may be used, for example, to detect a leakage of the system (in order thereby to initiate, for example, a suitable refilling operation).

The pressure sensor 26 further allows the individual cushion pressures P_cushion-1, P_cushion-2 . . . , P_cushion-n to be measured successively with great precision by the valve VA being moved into the switching position "0" and the valve 16 associated with the relevant cushion 12 being moved into the switching position "2".

At a start of operation, for example, a test for any leaks can initially be carried out in order subsequently to measure all the cushion pressures P_cushion-1, P_cushion-2 . . . , P_cushion-n successively and subsequently to use the measured values, for example, for the "start condition" of the mathematical model.

In order to avoid a pressure loss in the relevant cushion 12 brought about by the discharge channel arrangement 20 being flooded in this pressure measurement method, the discharge channel arrangement 20 is preferably briefly filled by means of the compressor 22 before this measurement by the valve VA being moved briefly into the switching status "1".

In the device 10 of FIG. 1, if a specific example of the cushions 12-1, 12-2 . . . 12-$n$ and the associated example of the container valves 16-1, 16-2 . . . 16-$n$ and the commonly used discharge channel valve VA are considered, a total of 3×3=9 possible combinations of the valve switching positions are produced.

The following table again sets out the 9 possible statuses (switching position combinations) "A" to "I", the resultant behavior with regard to the cushion 12 considered being set out for each status:

| Status: | Switching position of the container valve 1 . . . n: | Switching position of the valve VA: | Behavior of the cushion pressure P_cushion (1 . . . n) or device functionality: |
|---|---|---|---|
| A | 0 | 0 | Maintain cushion pressure |
| B | 1 | 0 | Fill cushion (normal filling speed or "first filling method") |
| C | 2 | 2 | Deflate cushion |
| D | 2 | 1 | Fill cushion (reduced filling speed or "second filling method") |
| E | 2 | 0 | Measure cushion pressure |
| F | 0 | 1 | Fill measurement channel (reduced filling speed) |

-continued

| Status: | Switching position of the container valve 1 . . . n: | Switching position of the valve VA: | Behavior of the cushion pressure P_cushion (1 . . . n) or device functionality: |
|---|---|---|---|
| | | | and maintain cushion pressure |
| G | 1 | 1 | Fill measurement channel (reduced filling speed) and fill cushion (normally) and measure |
| H | 0 | 2 | Discharge measurement channel and maintain cushion pressure |
| I | 1 | 2 | Discharge measurement channel and fill cushion (normally) |

In the status "E", the discharge channel arrangement 20 functions to a degree as a "measurement channel" connected to the relevant cushion 12 in order to measure the cushion pressure by means of the pressure sensor 26.

Before that measurement, the measurement channel can be filled via the valve VA to the expected cushion pressure P_cushion (status "F" or "G") in order to avoid a pressure loss in the relevant cushion 12 owing to the subsequent measurement.

Except for such measurements of the cushion pressures P_cushion carried out, for example, from time to time, the actual pressure monitoring and pressure adjustment based thereon are carried out by means of a mathematical model.

During the pressure adjustment, an increase or decrease of the cushion pressures P_cushion may be carried out, for example, in a time-controlled manner, that is to say, by the relevant inflation or deflation operation being carried out for a predetermined time; the resultant cushion pressure change results on the basis of the mathematical model.

In the simplest case, the supply pressure (compressor pressure PK) necessary for the model as an input variable already results from the properties of the pressure source specifically used (in this instance: compressor 22).

However, this supply pressure may optionally also be measured by an additional pressure sensor, the pressure sensor 24 in the example of FIG. 1, or a pressure sensor 24' which is illustrated with broken lines in FIG. 1 and which is arranged further downstream in the path of the filling channel. As a result, the peripheral condition "supply pressure" necessary for the mathematical model for use can be measured with greater accuracy.

If only one cushion 12 is being deflated (status "C"), the cushion pressure P_cushion can also be measured during that deflation with the central pressure sensor 26. Furthermore, if only one cushion 12 is filled at the reduced filling speed (status "D"), the relevant cushion pressure P_cushion can also be measured during that filling operation with the central pressure sensor 26. If only one cushion 12 is being filled (at normal filling speed) in the status "G", a measurement of the cushion pressure P_cushion can be carried out at the same time.

In the case of such pressure measurements during the deflation/filling, a deviation which is more or less large occurs in this instance between the actual cushion pressure P_cushion and the pressure PA measured by the pressure sensor depending on the technical flow conditions (flow resistances of the used lines, hoses, valves, etcetera). However, this can readily be taken into account by the mathematical model in order to calculate the cushion pressure P_cushion on the basis of the measured pressure PA taking into account all other relevant variables, and consequently to improve the adjustment accuracy. This consideration may take place, for example, in the form of a "correction" described in the publication DE 10333204A1 (cf. particularly, for example, claim 1 and paragraphs [0006], [0009], [0032], [0033] of DE10333204A1). In some embodiments, such a correction of the pressure PA measured by the pressure sensor 26 may also be carried out in order to obtain the cushion pressure P_cushion.

In the following description of additional embodiments, the same reference numerals supplemented by a lower case letter in order to distinguish the embodiment are used for components having the same effect. Substantially only the differences in relation to the embodiment(s) already described are discussed and reference is hereby expressly further made to the description of the preceding embodiments.

Figure 2:
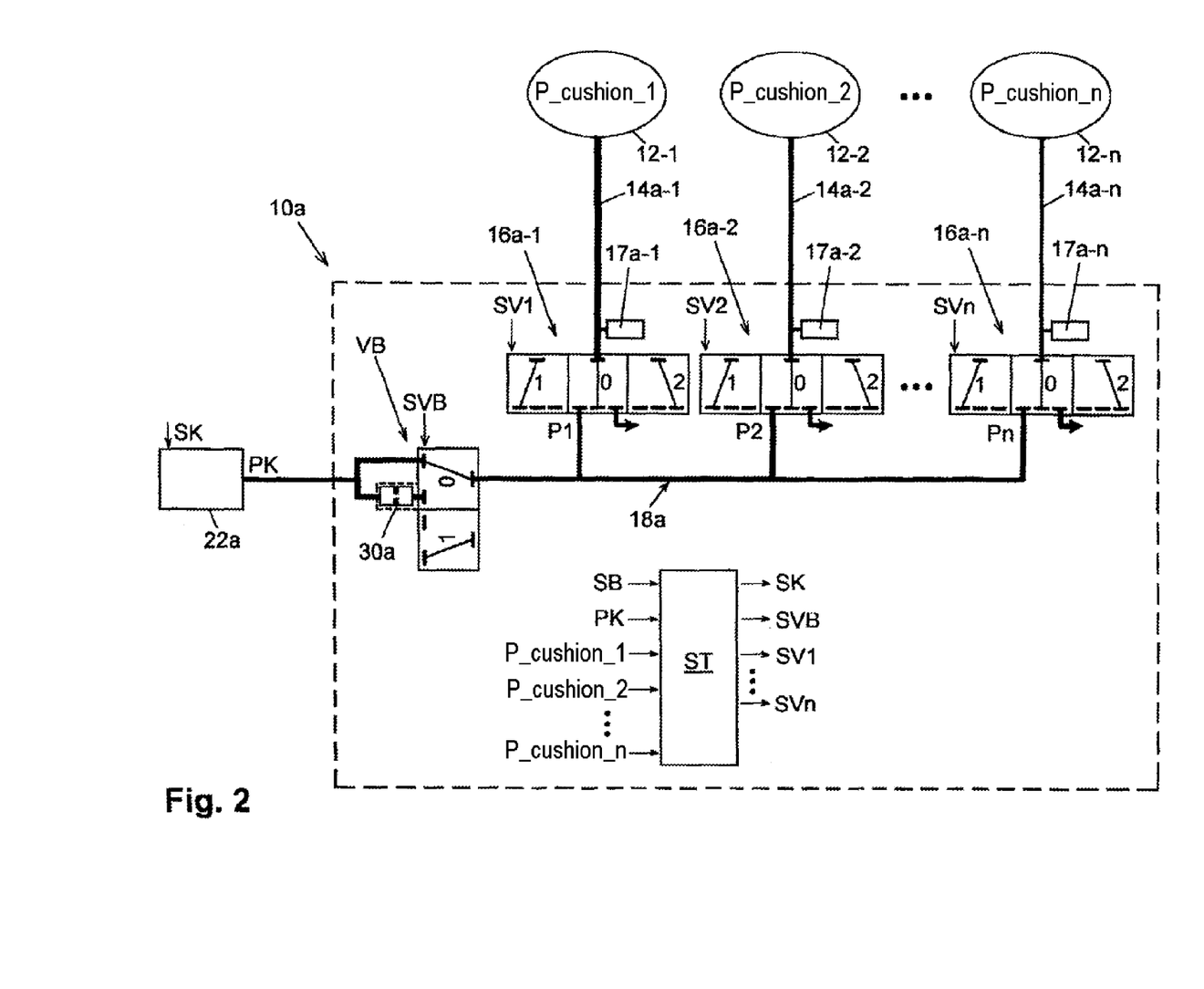
FIG. 2 is a block diagram of a device for controllably inflating and deflating a plurality of air cushions in accordance with a second embodiment.

FIG. 2 shows a device 10a according to a second embodiment.

Unlike in the above-described embodiment, pressure sensors 17a-1, 17a-2 . . . 17a-n which are arranged on the connection lines 14a of the relevant cushions 12a are provided in the device 10a.

Another difference in relation to the first embodiment is that a discharge channel arrangement common to the container valves 16a-1, 16a-2 . . . 16a-n is not associated in the device 10a but instead the corresponding valve connections are directly connected to atmosphere ("pressureless media sink").

A peculiarity of the device 10a is that there is provided a filling channel valve VB by means of which a filling channel arrangement 18a can be selectively connected to an air compressor 22a directly or via a throttle 30a. In the example illustrated, the valve VB is a 3/2-way valve.

Consequently, two different filling speeds can advantageously be achieved by the filling channel valve VB (control signal SVB) being controlled accordingly.

In a switching position "0", the compressor pressure PK is applied directly to the filling channel arrangement 18a (normal filling speed), whereas the flow takes place via the throttle 30a in a switching position "1" (reduced filling speed).

A reduced filling speed achieved in the context of the present disclosure particularly allows imperceptible or relatively small correction operations, for example, in order to compensate for gradual pressure changes by, for example, leaks, temperature changes, etcetera.

The throttle 30a can be combined, for example, structurally with the valve VB, that is to say, in particular integrated in the valve VB.

FIGS. 3 and 4 again illustrate the already-mentioned possibility of calculating cushion pressures on the basis of a mathematical model in order thereby to be able to dispense with pressure sensors which are individually associated with the individual cushions (generally: containers) and which measure in a precise manner.

Figure 3:
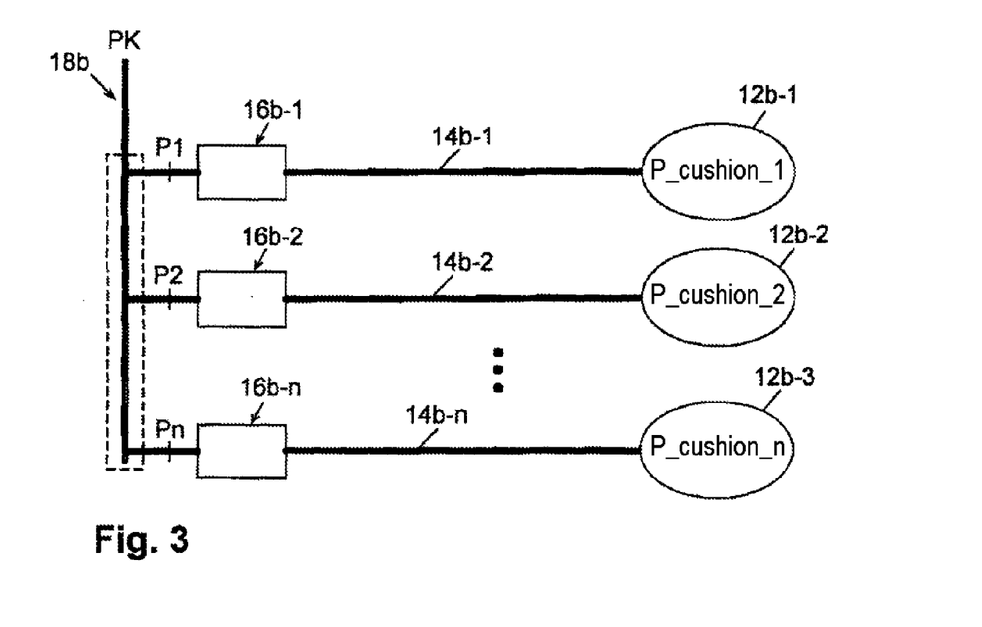
FIG. 3 is a block diagram of a portion (filling channel arrangement) of a device for controlled filling and deflation of a plurality of air cushions in order to explain the use of a mathematical model in establishing the cushion pressure.

FIG. 3 shows a filling channel arrangement 18b, to which a corresponding plurality of air cushions 12b-1, 12b-2 . . . 12b-n are connected via container valves 16b-1, 16b-2 . . . 16b-n and connection hoses 14b-1, 14b-2 . . . 14b-n.

The filling channel arrangement 18b may be, for example, the filling channel arrangement of one of the embodiments already described (FIGS. 1 and 2).

The filling channel arrangement 18b is supplied with a compressor pressure PK (for example, 1000 hPa) at an input of a filling channel, from which channel branches branch off to the individual valve inputs. The filling channel arrangement 18b forms to a degree a "pressure distributor" (illustrated with broken lines in FIG. 3). The pressures present at the valve inputs are designated P1, P2 . . . Pn in FIG. 3.

If the valves 16b illustrated in FIG. 3 are closed (switching status "0" or "2"), the pressures P1, P2 . . . Pn all take on the value of the supply pressure PK. The individual cushion pressures P_cushion-1, P_cushion-2 . . . , P_cushion-n remain unchanged in the case of the switching status "0" ("maintain").

If at least one of the valves 16b is opened, however, deviations, on the one hand, of the pressures P1, P2 . . . Pn relative to each other and in comparison with the pressure PK occur. If a plurality of the cushions 12b are filled, there is in principle an effect on the pressures P1, P2 . . . Pn. This effect is dependent on the overall switching status of the valves 16b and the individual cushion pressures P_cushion-1, P_cushion-2 . . . , P_cushion-n because the flow decreases when the cushions 12b become fuller. The longer a specific one of the valves 16b is open, the more the pressure at the corresponding valve input and in the corresponding cushion conform to the supply pressure PK.

It is readily apparent to the average person skilled in the art that, taking into consideration the physical conditions and the technical flow properties of the device components used, it is readily possible to formulate a mathematical model which supplies the values of the pressures P1, P2 . . . Pn resulting at the valve inputs as output variables on the basis of the (for example, measured) supply pressure PK, the switching statuses of the valves 16b known in any case and the current cushion pressures P_cushion as input variables.

Figure 4:
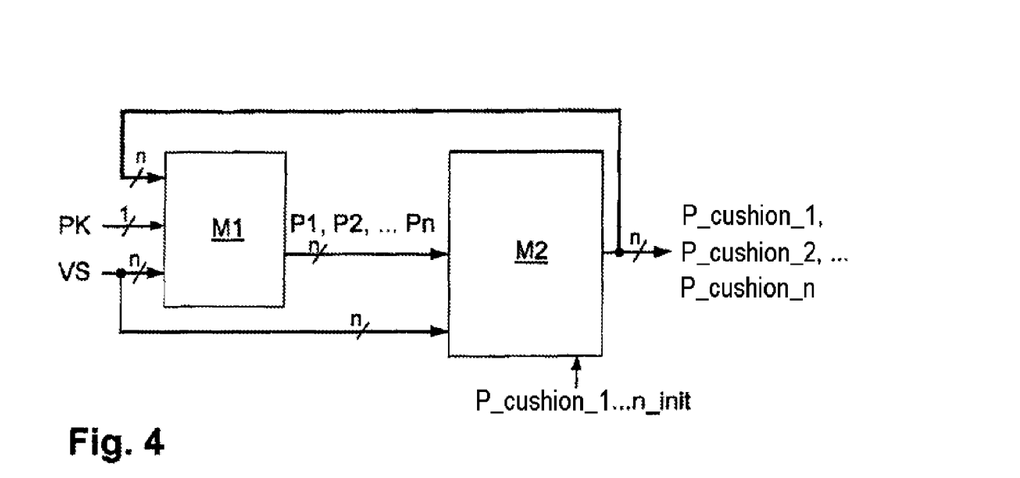
FIG. 4 is an illustration of a mathematical model suitable for establishing the cushion pressure.

A partial model M1 of a corresponding model is indicated in FIG. 4.

At any time (during a filling phase), the actual pressures P1, P2 . . . Pn at the inputs of the valves 16b-1, 16b-2 . . . 16b-n are established with the model M1. At the input side, the values of the last cushion pressures established P_cushion-1, P_cushion-2 . . . , P_cushion-n, the current compression pressure PK and the current "overall valve status" VS, that is to say, the switching statuses of all the valves of the device, are supplied to the model M1.

On the basis of that detection result (and taking into consideration the valve statuses), a change in the individual cushion pressures P_cushion-1, P_cushion-2 . . . , P_cushion-n can subsequently be calculated on the basis of an additional partial model M2 (see FIG. 4). Consequently, the model M2 uses the previously established pressures P1, P2 . . . Pn. The cushion pressures updated on the basis of the cushion pressure changes can subsequently be used again as input variables of the model M1 (cf. FIG. 4).

Consequently, the partial models M1 and M2 form a mathematical model or a calculation algorithm for establishing the cushion pressures P_cushion-1, P_cushion-2 . . . , P_cushion-n with regard to operating phases in which filling is carried out via the filling channel arrangement 18. The time progression of the pressures at the valve inputs is advantageously taken into consideration when the cushion pressures are calculated. Therefore, they do not have to be constant (or be assumed to be constant).

If additional information concerning individual pressures of the cushion pressures is available, it can also be taken into consideration. Such information is available, for example, if a cushion 12b has been deflated for a relatively long period of time. Such information is also available, for example, if one or more cushion pressures has/have been measured by means of a pressure sensor. A corresponding measurement method has already been described above with reference to FIG. 1 (measurement of the cushion pressures by means of the central pressure sensor 26). The corresponding information can be used to re-initialize the cushion pressure calculated on the basis of the model (see FIG. 4, input variable "P_cushion_1 . . . n_init").

Model parameters which are necessary for formulating the models M1 and M2 are substantially produced from the geometry data of the device components used (line lengths, line cross-sections, flow resistances of the valves, etcetera).

Since individual cushions 12b are also deflated during operation of the device, where applicable, the mathematical model illustrated in FIGS. 3 and 4 merely for the case of filling must ultimately be further supplemented with a completely similarly derivable model for the case of deflation. The deflation of individual valves 12b can be carried out via the corresponding lines 14b and valves 16b, for example, directly to atmosphere (cf. also the embodiment according to FIG. 2) or, for example, via a discharge channel arrangement (cf. also the embodiment according to FIG. 1). In both cases, it is again possible to determine a mathematical model or a mathematical model which is similarly combined from partial models and to use it to calculate the cushion pressures in phases of a deflation operation.

LIST OF REFERENCE NUMERALS

10 Device
ST Control unit
12 Inflatable air cushions
14 Connection lines
16 Container valves
VA Discharge channel valve
VB Filling channel valve
17 Pressure measurement sensors
18 Filling channel arrangement
20 Discharge channel arrangement
22 Compressor
24 Filling channel pressure sensor
26 Discharge channel pressure sensor
28 Throttle
30 Throttle

What is claimed is:

1. A device for operating a plurality of containers that can each be filled with a medium, the device comprising:
a plurality of container valves, each comprising a 3-way valve and connected to one of the containers through a respective first branch,
a filling channel arrangement configured to receive the medium from a media pressure source and connected to a second branch of each of the plurality of container valves, and
a discharge channel arrangement connected to a third branch of each of the plurality of container valves and selectively connectable to a pressureless media sink via a discharge channel valve,
wherein the media pressure source is selectively connectable to the discharge channel arrangement via the discharge channel valve so that the plurality of containers may be filled through the discharge channel arrangement via the respective third branches of the plurality of container valves.

2. The device of claim 1, comprising a control device programmed to:
control the plurality of valves based on an actuation parameter supplied to the control device, and calculate a media pressure in a specific container using a mathematical model based at least on a media pressure supplied by the media pressure source and status information regarding the container valves.

3. The device of claim 1, comprising a filling channel pressure sensor configured to detect a media pressure supplied by the media pressure source.

4. The device of claim 1, comprising a discharge channel pressure sensor configured to detect a media pressure in the discharge channel arrangement.

5. The device of claim 1, wherein the selective connection between the discharge channel arrangement and the media pressure source via the discharge channel valve contains a throttle.

6. The device of claim 1, comprising a filling channel valve configured to selectively connect the filling channel arrangement to the media pressure source directly or via a throttle.

7. A method for operating a plurality of containers that can each be filled with a medium using a system including a plurality of 3-way container valves each having a respective first branch connected to one of the containers, a filling channel arrangement connected to a second branch of each of the plurality of container valves and configured to receive the medium from a media pressure source, and a discharge channel arrangement connected to a third branch of the plurality of container valves and selectively connectable to either a pressureless media sink or the media pressure source via a discharge channel valve, the method comprising:

controlling the container valves to selectively connect each of the containers with the filling channel arrangement to receive the medium from the media pressure source, and controlling the discharge channel valve to selectively connect the discharge channel arrangement to the media pressure source to provide the medium to the plurality of containers through the discharge channel arrangement.

8. The method of claim 7, comprising calculating the media pressure in a specific container using a mathematical model based at least one a media pressure supplied by the media pressure source and status information regarding the container valves.

9. The method of claim 7, comprising establishing the media pressure in a specific container by:

connecting the specific container to the discharge channel arrangement by controlling the respective container valve, isolating the discharge channel arrangement from the pressureless media sink by controlling the discharge channel valve, and measuring the media pressure in the discharge channel arrangement.

10. The method of claim 7, comprising controlling a filling channel valve to selectively connect the filling channel arrangement to the media pressure source directly or via a throttle.

* * * * *

UNITED STATES PATENT AND TRADEMARK OFFICE
CERTIFICATE OF CORRECTION

PATENT NO. : 9,457,694 B2
APPLICATION NO. : 13/995112
DATED : October 4, 2016
INVENTOR(S) : Martin Ebel et al.

Page 1 of 1

It is certified that error appears in the above-identified patent and that said Letters Patent is hereby corrected as shown below:

On the Title Page

(73) Assignee: ---CONTINENTAL AUTOMOTIVE GMBH, Hanover (DE)---

Change to ---CONTI TEMIC MICROELECTRONIC GMBH, Nuernberg (DE)---.

Signed and Sealed this
Fourteenth Day of March, 2017

Michelle K. Lee
*Director of the United States Patent and Trademark Office*